United States Patent [19]
Jonsson

[11] Patent Number: 5,995,842
[45] Date of Patent: Nov. 30, 1999

[54] ARRANGEMENT WITH A SHORT-RANGE RADIO SYSTEM

[75] Inventor: Ulf Jonsson, Svedala, Sweden

[73] Assignee: Telia AB, Farsta, Sweden

[21] Appl. No.: 08/580,499

[22] Filed: Dec. 29, 1995

Related U.S. Application Data

[63] Continuation of application No. 08/246,500, May 20, 1994, abandoned.

[30] Foreign Application Priority Data

Jun. 2, 1993 [SE] Sweden ................................ 9301884

[51] Int. Cl.$^6$ ........................................... H04Q 7/20
[52] U.S. Cl. ..................... 455/462; 455/426; 455/435; 455/406; 455/408; 455/432
[58] Field of Search .................................. 455/426, 410, 455/406, 408, 411, 422, 403, 432, 433, 434, 435, 436, 437, 480, 462, 550, 553, 465

[56] References Cited

U.S. PATENT DOCUMENTS

| | | | |
|---|---|---|---|
| 4,989,230 | 1/1991 | Gillig et al. . | |
| 5,136,650 | 8/1992 | Stahl et al. | 455/406 |
| 5,148,472 | 9/1992 | Freese et al. . | |
| 5,325,419 | 6/1994 | Connolly et al. | 455/435 |
| 5,353,331 | 10/1994 | Emery et al. | 379/58 |
| 5,418,838 | 5/1995 | Havermans et al. | 379/59 X |
| 5,442,680 | 8/1995 | Schellinger et al. | 455/462 |
| 5,448,619 | 9/1995 | Evans et al. | 455/426 |
| 5,613,199 | 3/1997 | Yahagi | 455/435 |

OTHER PUBLICATIONS

"Cellular Mobile Radio as an Intelligent Network Application" *Electrical Communication,* vol. 63, #4, M. Ballard et al.

*Primary Examiner*—Wellington Chin
*Assistant Examiner*—Keith Ferguson
*Attorney, Agent, or Firm*—Oblon, Spivak, McClelland, Maier & Neustadt, P.C.

[57] ABSTRACT

A release is carried out by PP transmitting CC-person who belongs to a radio system with a short range, for example a wireless telephony system, can be temporarily transferred as guest into a second wireless telephony system. When the user moves to a second communications system, he identifies himself in it as a guest. Information relating to the temporary address of the relevant person is transferred to his home system. An incoming call to the person in question is received by the home system which forwards the call to the system in which the person sought is temporarily registered. The caller is then notified that a call is coming in by a call signal being originated. The called party then answers the call and a normal call is set up. With an outgoing call, signals are transferred from the caller to the network which registers who is establishing the call. The registration is carried out on the basis of a call occurring from a certain subscription, or person, regardless of whether the call is established from the home system or as guest in another system. The system then registers the length of the call and debits the subscriber at his home address.

15 Claims, 10 Drawing Sheets

ARRANGEMENT WITH A SHORT-RANGE RADIO SYSTEM

This application is a Continuation of application Ser. No. 08/246,500, filed on May 20, 1994, now abandoned.

TECHNICAL FIELD

The present invention relates to an arrangement for producing, in a mobile radio communications system comprising, on the one hand, closely placed base stations and operating at short range and, on the one hand, mobile units, a simplified function for mobile units from a first communications system to communicate via a second communications system.

PRIOR ART

In radio systems, preferably cordless telecommunication standards, extensive mobility, including the possibility of incoming and outgoing calls, for telephones can only be offered by mobile telephone systems of a Global System for Mobile communications (GSM) and a Nordic Mobile Telephone (NMT) system. These require an extensive, costly infrastructure overlaid on the existing fixed telephone network. None of the mobile telephone systems existing today are constructed for handling the high traffic intensity and service quality required by customers in the fixed telephone network. Nor is there any system today which can handle the "anarchistic" infrastructure with an uncontrollable variety of private and public access systems which are an unavoidable consequence of the trend towards a completely liberalized telecommunications market which can be seen today. In wireless communications systems, it has previously been known, according to Patent Specification WO 92/10913, to increase the user friendliness in cordless mobile telephone systems.

DESCRIPTION OF THE INVENTION

Technical Problem

Extensive mobility including the capability of incoming and outgoing calls for telephones can only be offered today by mobile telephone systems of the NMT and GSM types. These require an extensive and costly infrastructure, overlaid on the existing fixed telephone network. None of the mobile telephone systems existing today are constructed for handling the high traffic intensity and service quality required by customers in the fixed telephone network. Neither can they handle the "anarchistic" infrastructure with an uncontrollable variety of private and public access systems which are an unavoidable consequence of the trend towards a completely liberalized telecommunications market which can be seen today.

A limited mobility for telephones is offered by cordless telephones existing today (so-called CT0, CT1, CT2 and CT3) and coming telephone standards (DECT). The restriction means mobility only within the range of one or a small number of base stations (cells or clusters, respectively), or capability to initiate calls (and also a rudimentary capability for incoming calls in certain systems) in public base stations (so-called telepoint). In the latter case, an infrastructure (which is simple per se) is built up, overlaid on the telephone network, and separate administrative systems (D&U, customer handling, debiting and so forth) are required.

To compensate for these restrictions, however, the cordless telephones (especially DECT) can handle both very high traffic intensities and all (suitable narrow-band) present and future telecommunications services in the fixed telephone network such as an anarchistic infrastructure.

Another type of mobility which entails that a user can use an optional telephone for initiating and receiving telephone calls and having a personal account debited for these, will soon be offered by the international standard UPT (Universal Personal Telecommunications service) and national variants of this, called Kontosamtal (account call) and Personligt Nummer (personal number) in Sweden. This so-called personal mobility is integrated in the fixed network and utilizes advanced network functions, a so-called intelligent network (IN).

However, this requires access to a telephone which is not always obvious, for example in public places (streets and squares, railway stations, shopping centres and so forth). Moreover, its user interface is not particularly user-friendly in the first phase.

The above description shows that the types of terminal mobility which are offered today do not fulfil the requirements which customers have or will have in the near future. At the same time, there are a number of systems, services and standards, each of which fulfils part of these requirements. The problem is that they are not integrated or coordinated in a manner which would be desirable.

The present invention intends to solve the above problems.

Solution

The present invention relates to an arrangement for producing in a radio system a simplified function for mobile units from a first communications system to communicate with a second communications system. Both the first and the second communications system comprise closely placed base stations which operate with a short range. The first and second communications system can be connected to a telephone network which operates with a personal telephony service. Mobile units are arranged to establish connections to the said second communications system for connection to the said personal telephony service.

The mobile unit normally belongs to the first communications system. On visiting the second communications system, however, it is desired that the communication capabilities be transferred to the second system. For this purpose, the normal set is taken along from the first communications system to the second communications system, or alternatively a set is borrowed in the second system. The user then identifies himself to the second communications system which establishes contact with the personal telephony service. The personal telephony service which is arranged to accommodate the subscription of the mobile units affected, arranges contact with the first communications system. In the first communications system, handovers are automatically initiated for transferring calls from the first system to the second system if anyone is seeking the person in question. A simplification in the handling of callers means that they do not need to know where the caller is located.

The mobile unit, through identification in the personal telephony service, can utilize the said first and/or second communications system and have a personal account intended for this purpose debited thereby. The said personal account is handled, for example, by an intelligent network.

The first and second communications system is a home base for private customers and/or business networks with a number of base stations or a home base. The first and second communications system is a cordless communications system, preferably a DECT system. The said telephone system is preferably a general telephone network or other telephone network with a wide geographic coverage. The personal telephony service is a service for personal mobility, preferably UPT (Universal Personal Telecommunication). The telephone system preferably consists of a broad band system, for example ISDN. Furthermore, the telephone systems can be constituted by mobile radio systems of the GSM and NMT types.

Advantages

The present invention specifies a solution in which subscribers are mobile within and between different communications systems. This means that a subscriber can freely move between different telephone systems which are connected to one another in some form of telephone network. Furthermore, the personal telephony service provides a possibility of debiting the user for communications made. This is regardless of where the person in question is located, provided he is located within systems which can establish contact with one another.

Debiting of established connections is entered in the personal account of the user via the personal telephony service. Transfer between the communications system used and the home system occurs via a network which connects the said communications systems.

The invention thus provides a significantly simplified method for subscribers who move between different addresses and communications systems. For the party calling the user, this means that the former does not need to know where the latter is located. Switching-over to the called party occurs automatically in the first system via a general telephone network to the second system. The significance of this is that the user is always accessible provided he is located within ranges where there are communication paths between his home base and a current location visited.

DETAILED DESCRIPTION OF A PREFERRED EMBODIMENT

Figure 7A:
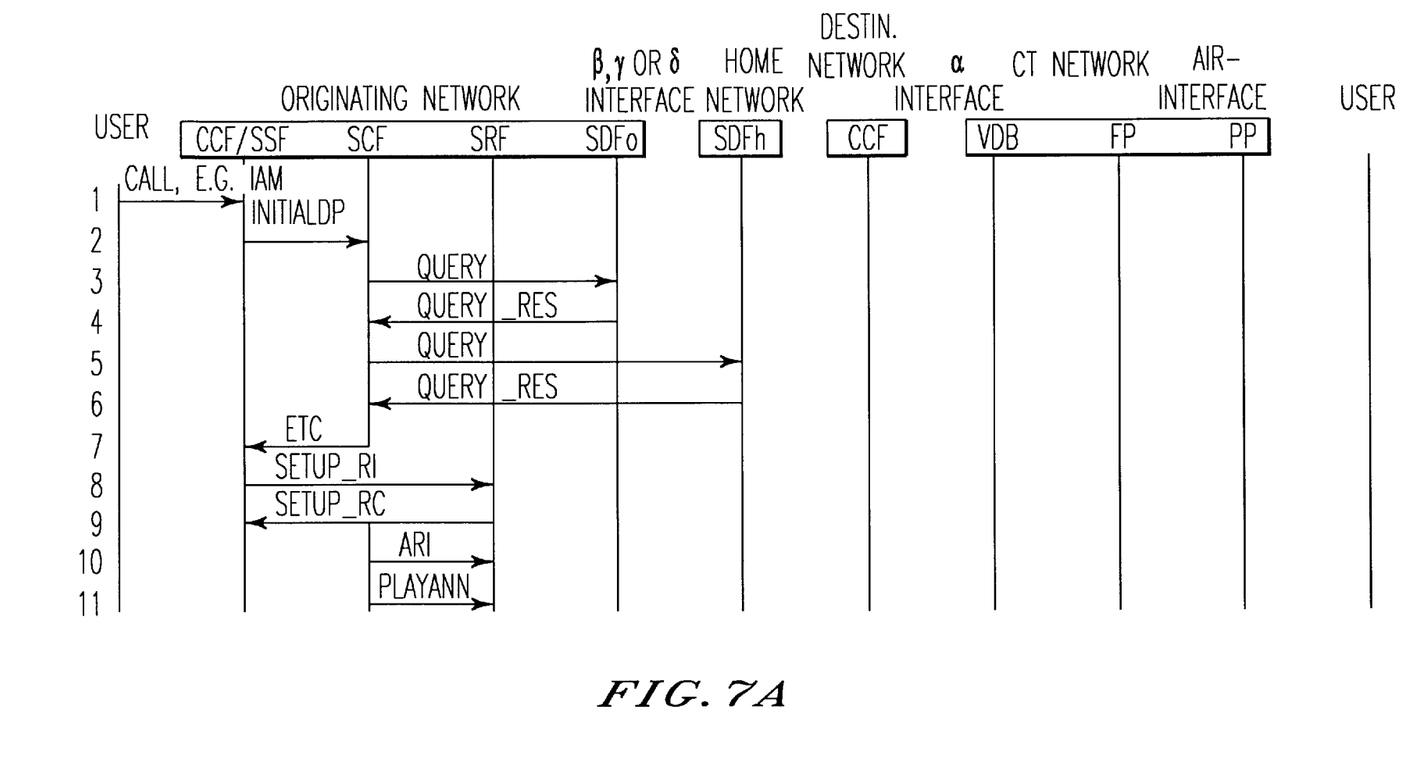
FIGS. 7 and 8 show signal diagrams for incoming calls.
Figure 7B:
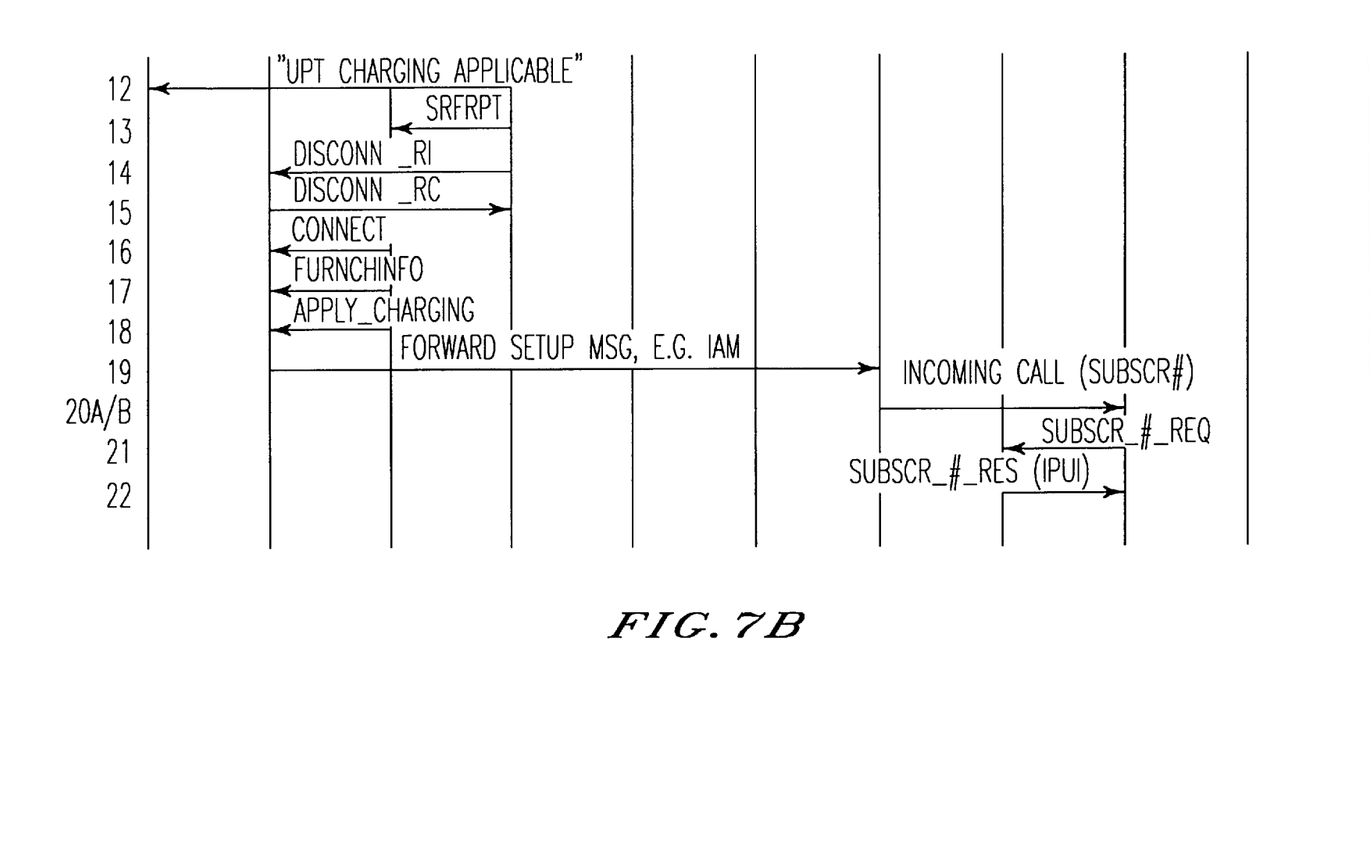
Figure 8:
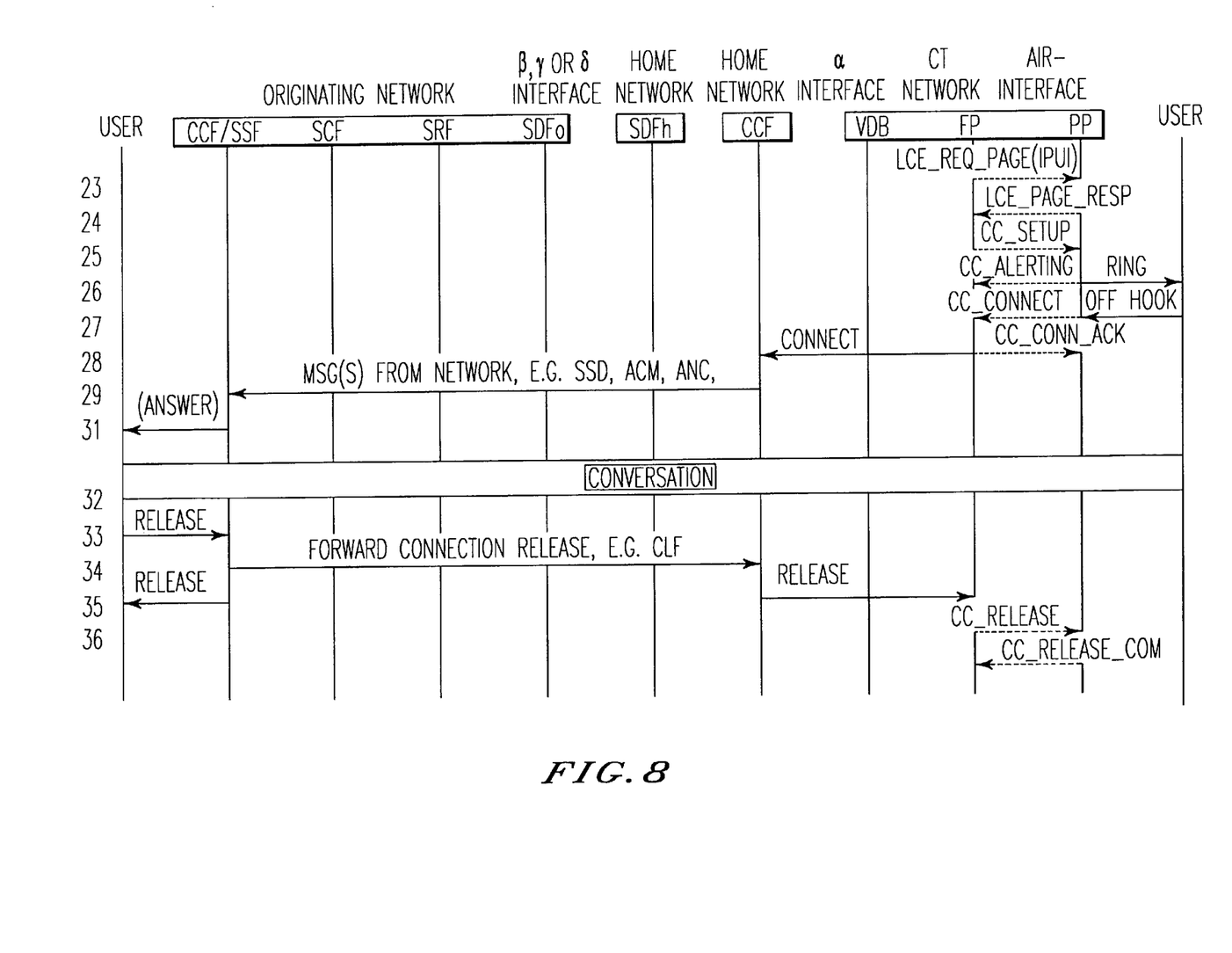
Figure 9:
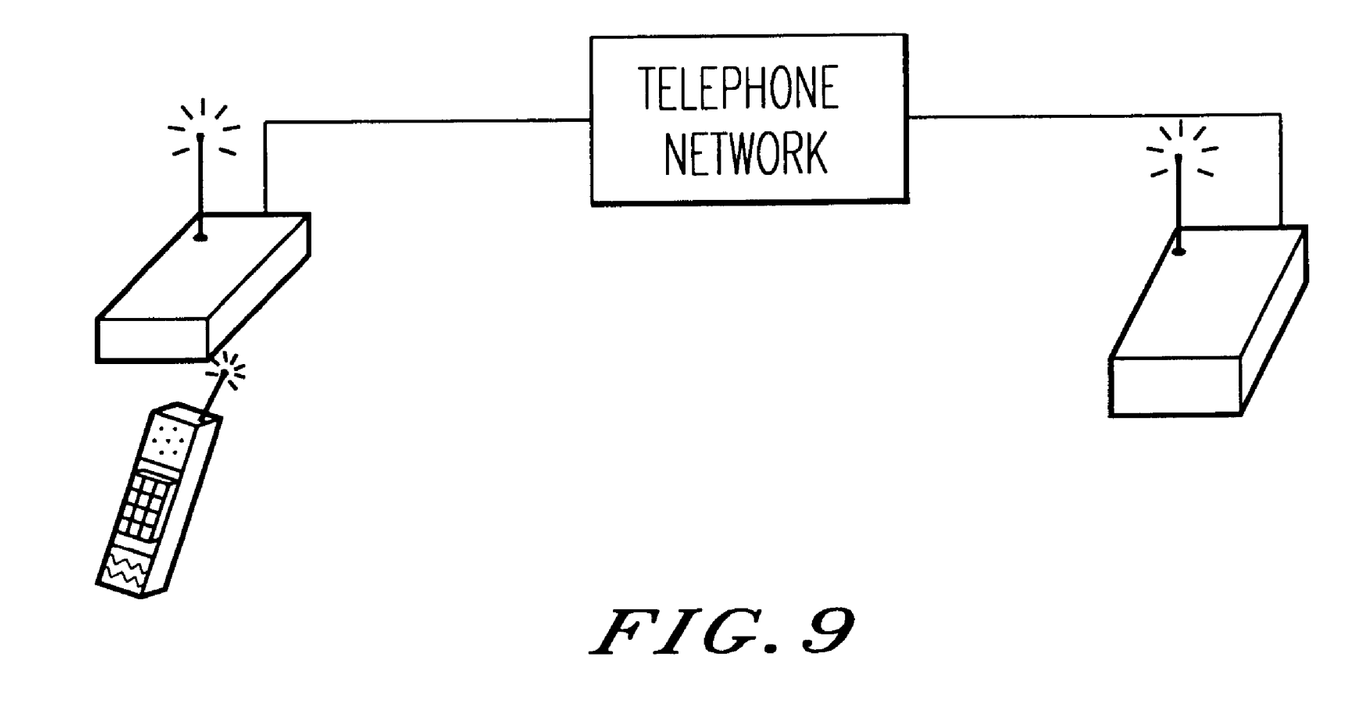
FIG. 9 shows one embodiment of the present invention.

Applicant's invention will be readily understood by reviewing FIGS. 1–8 which show the connection procedure sequentially through the system at either a call's origination, a call acceptance, or upon the disconnect of a call or the like and FIG. 9 which shows one embodiment of the present system. This includes the "hand-off" procedure in the order of steps listed. Each of the individual layers of the figures shows individual steps and can be considered to be subdivided into the multiple signals and communication protocols that are laid out therein.

Furthermore, with respect to the various terms used herein, the term FP stands for fixed port, the term RFPI stands for radio fixed port identity, ARI stands for access rights identity, PP stands for portable port, PARK stands for portable access right key, CC-SETUP is a request for call setup to a fixed port, IPUI is international portable user's identity, VDB stands for visitor's database, CC-CONNECT stands for acknowledgement of a setup request, UTP stands for universal personal telecommunications service, PUI stands for personal user identity, UPTAC stands for universal personal telephone access code, CTM stands for cordless terminal mobility, DAM stands for a DEC authentication module (with DECT standing for the proposed digital electronic cordless telephone standard), CT stands for cordless terminal, PAP stands for portable access profile, CT-2 stands for telepoint, UPTN stands for universal personal telecommunication number, RFP stands for radio fixed port, RE is radio exchange and LE is local exchange.

1. FP transmits uninterruptedly a signal with Radio Fixed Part Identity (RFPI). RFPI identifies FP but also contains a list of Access Right Identities (ARIs) which define the type of PP which is allowed access.
2. A PP within the coverage area of FP identifies the FP as new by analysing the RFPI. If the ARI of the RFPI is equivalent to the Portable Access Rights Key (PARK) of the PP, that is to say the PP is allowed access to the FP, the PP asks the user (for example via the display) if registration is to be carried out.
   NOTE: This request can be left out by allowing a process within the PP to initiate automatic registration without asking the user. In this case, step 2 and step 3 below will be excluded.
   Steps 1–3 are not needed if completely manual registration including initiation by the user is to be preferred. In this case, the user must be aware if there is a base station which can allow access, and one switches on the PP and initiates a call.
3. If the user wishes to register, he acknowledges the inquiry.
4 part 1 and part 2 The PP requests a call establishment by transmitting a CC-SETUP message to the FP. The message contains the unique identity of the PP, the IPUI (see above), which includes the PUI.
4 part 3 The PP transmits a LOC-REQ message to the FP, including the IPUI as above.
5. The FP asks the VDB about the IPUI.
6. The VDB analyses the IPUI and identifies the PUI.
   NOTE: The FP controlling the IPUI in a VDB is a standard procedure, even in a home system. In this case, however, the inquiry will be an internal inquiry to a single register.
7, first step, The FP transmits a AUTH-REQ message to the PP.
7, second step PP transmits a AUTH-RES message with DECT-specific authentication information.
7, third step, The FP acknowledges the setting-up inquiry by transmitting a CC-CONNECT message to the PP.
10 The PP initiates a UPT inquiry. This inquiry can be either a standard UPT inquiry (10a) or a more advanced inquiry (10b) in which the PP, after the connection with SRF has been established, transmits all information needed for registration (PUI, verification code (including PIN or separate PIN transmission as in step 19) and the identification code for the desired service, in this case "registration"). A third solution is to have a SRF which can transmit both speech information and DTMF signals to the user (PP), in which steps 18b, 19b, 25b–27b, 34b, 35b and 43b are possible.
   If steps 1–3 are not carried out as described in the note to step 2, a registration inquiry must be made by the user (for example by using the short number register) before PP makes the UPT inquiry. This is necessary both for 10a and 10b.
   NOTE: The second solution requires that the network can transfer the A-number identity (see below), otherwise the "roaming" number must be sent by the PP and the PP does not have the knowledge in this case. For this alternative, steps 18, 19, 26a/b1, 34 and 35 are not needed.

If SRF can send both speech information and DTMF signals to the user, he must be informed if DTMF will be used instead of using speech information. This can be arranged by using a separate UPTAC for users who avail themselves of the CTM service, that is to say UPT accessibility via a wireless access network, or including the information in a forced block transmission on UPT inquiry. If the network can handle A-number transmission, the inquiry (in a network-internal message) will also contain the address of the FP, that is to say the roaming number of the PP.

10 After having received the authentication information from the PP, the FP makes a UPT inquiry by transmitting the PUI, verification information, service feature identity and possibly the DTMF inquiry of the PP.

16 SRF transmits an identity and authentication inquiry to the PP.

16 The PP requests the user to "hit" UPT PIN.

NOTE: The PIN could also be stored in DAM, but this would reduce the safety level.

17 first step The user transmits the identity (PUI) by using a short-number register in DAM or PP, and in connection with the PIN.

NOTE: PP and DAM/PP short-number registers thus act as a UPT number transmitter.

17 second step The user only hits PIN and the PP contributes the PUI and the rest of the verification code.

17 first and second steps The PP transmits the identity and verification information in the automatic UPT procedure.

23, first step SRF requests the user to identify the service function.

23, second step, SRF requests the PP to identify the service function.

24, first step, The user requests registration by using the short-number register again, this function identity being transmitted to SRF.

C4, second step, The PP transmits the registration inquiry automatically to SRF. Since the user (or an automatic process in the PP) requested registration in step 2, the PP has this information and does not need to ask the user.

25, first and second steps, After an approved identification and verification series, the PP requests the FP to store its identity (IPUI including PUI) as a registered PP. This inquiry is transmitted by the FP to the VDB. If the network does not have an A-number identification, the PP must have the information about the roaming number. Since it is visiting a new FP, it is not aware of the address which the FP has. It therefore transmits a CC-INFO message which contains an inquiry about a subscriber number.

NOTE: Different roaming number distribution strategies can be used. If FP is, for example, a single-line home system, the subscriber number will be the network address of the FP. In the event that the FP is a large system with many lines/numbers, it can either be a connection number within the FP or the group number of the FP. In the former case, the roaming number should be allocated on registration which entails a need for a large number of connection numbers in the FP (as many as the maximally possible number of registered PP). It also requires DDI functionality in the FP. This solution is not to be preferred in (2). In the latter case, the roaming number (identifies a specific PP) is not allocated to the PP until an incoming call occurs. This solution only requires as many connection numbers in the PP as the maximum number of simultaneous calls. It also requires that the network can transfer the A-number identity.

If the network can transfer the A-number identity, this inquiry (26b) is not needed at all for getting the PP to inform the SRF about the roaming number, but for getting the FP to request the VDB to register the PP. It must therefore always make this inquiry.

26 first step The VDB responds to the FP with a roaming number (as described above), which is transferred by the FP through a CC-INFO message.

26 second step The FP transmits the registration inquiry to the SRF as a response to the inquiry about a service function from the SRF.

34 second step The SRF asks the PP about the roaming number.

34 third step The SRF asks the FP about the roaming number.

35 second step The PP responds with the roaming number as described above.

35 third step The FP responds with the roaming number as described above.

NOTE: If the network can transfer the A-number identity, the roaming number, that is to say the group number of the FP, is already sent in step 10b. Steps 34–35 can therefore be eliminated.

43 second step, first part The SRF confirms registration to the PP.

43 third step, first part The SRF confirms registration to the FP.

43 second step, first part After having received the registration confirmation from the SRF, the FP transmits a LOCATE-ACCEPT message to the PP as a confirmation and concluding of the DECT registration procedure.

43 third step The PP informs the user, for example via the display, that registration has been successfully carried out.

44 both parts When the user hangs up, the PP requests a call termination in a CC-RELEASE message to the FP.

45 both parts The call release is definite when the FP transmits a CC-RELEASE-COM message back to the PP. For an outgoing call.

Figure 1:
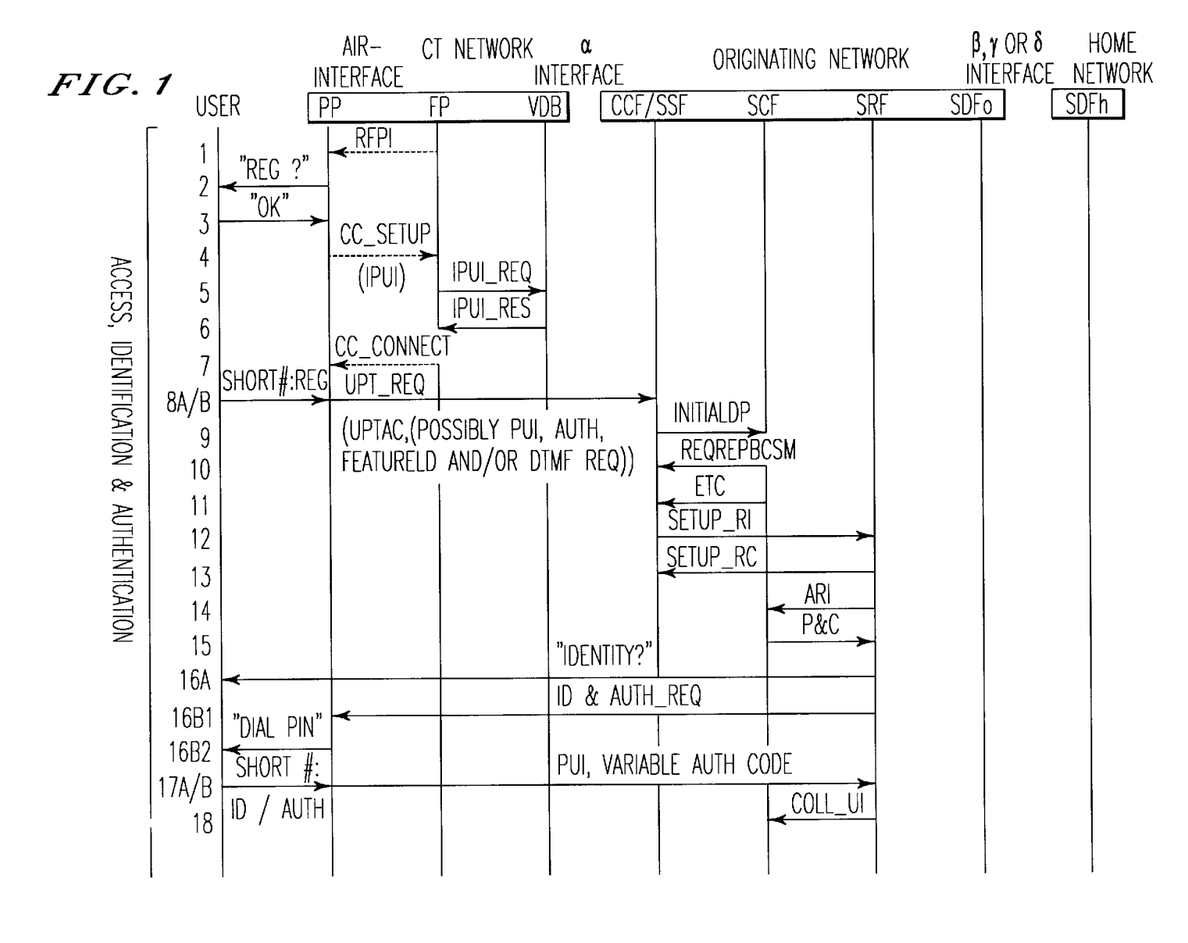
FIGS. 1–4 show signal diagrams for registration.
Figure 2:
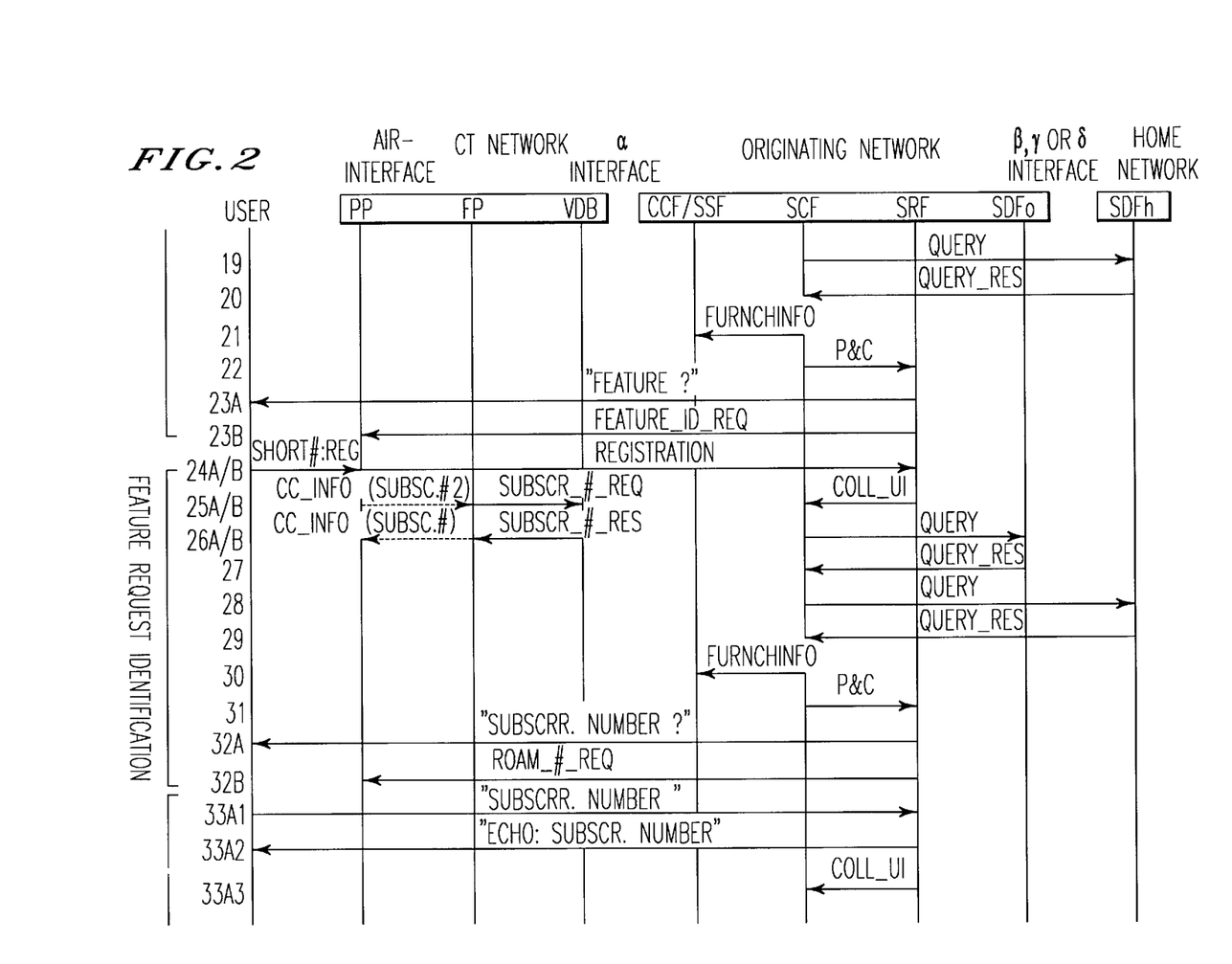
Figure 3:
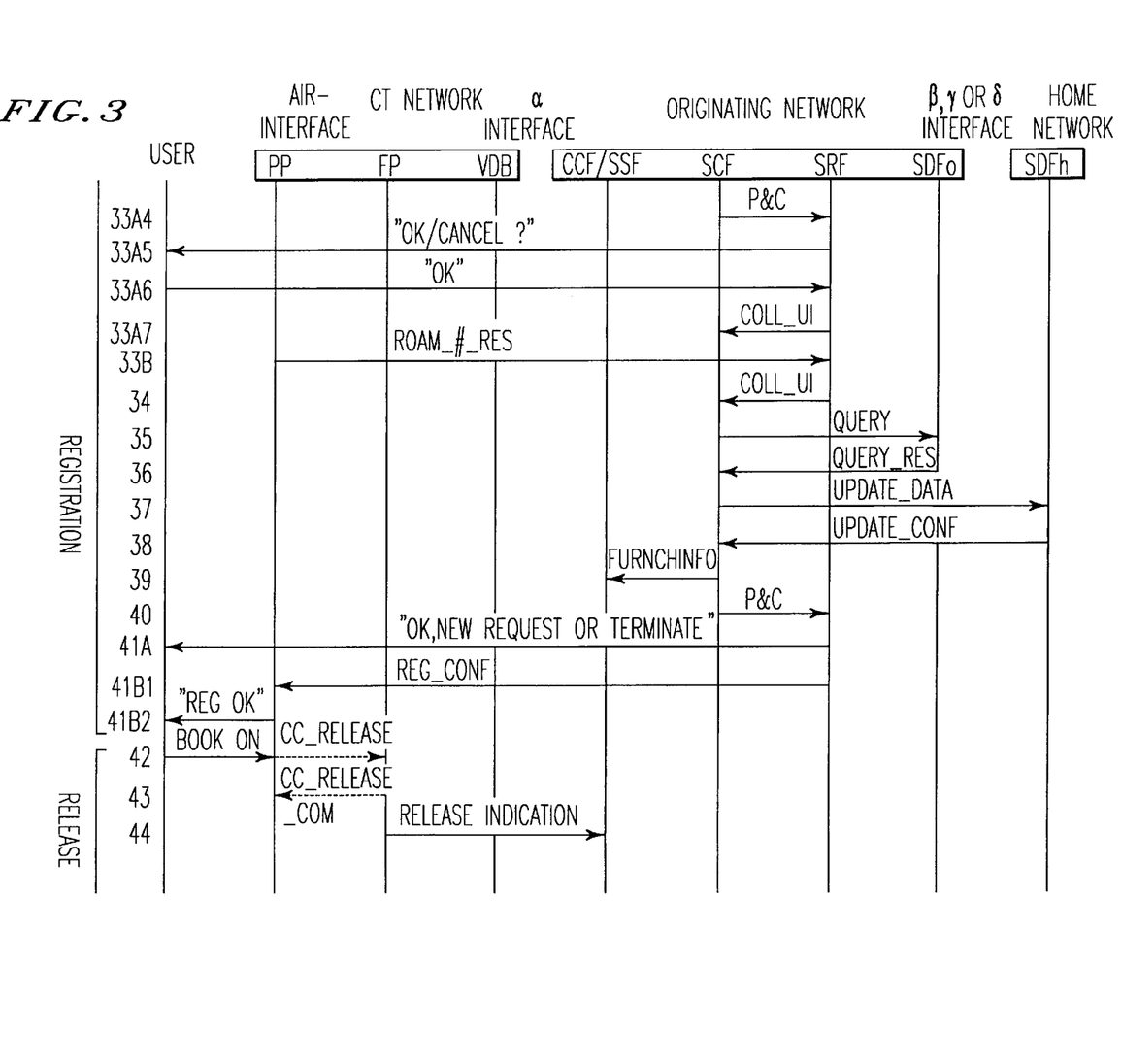
Figure 4:
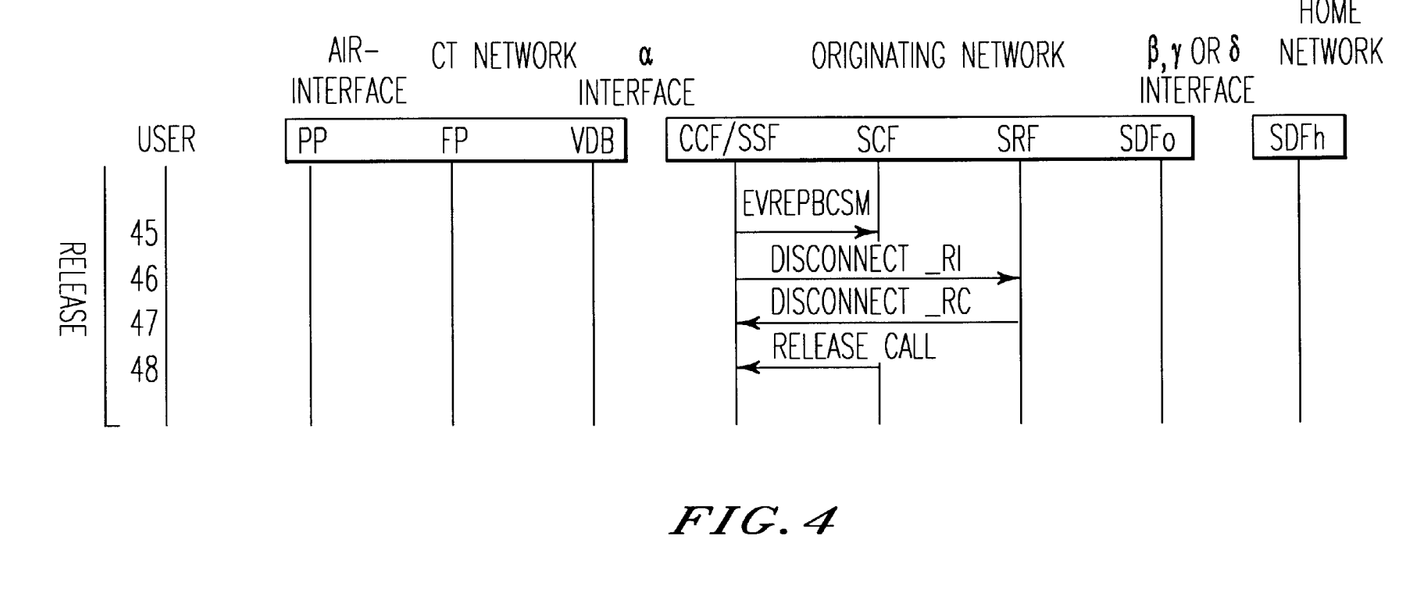
Figure 5:
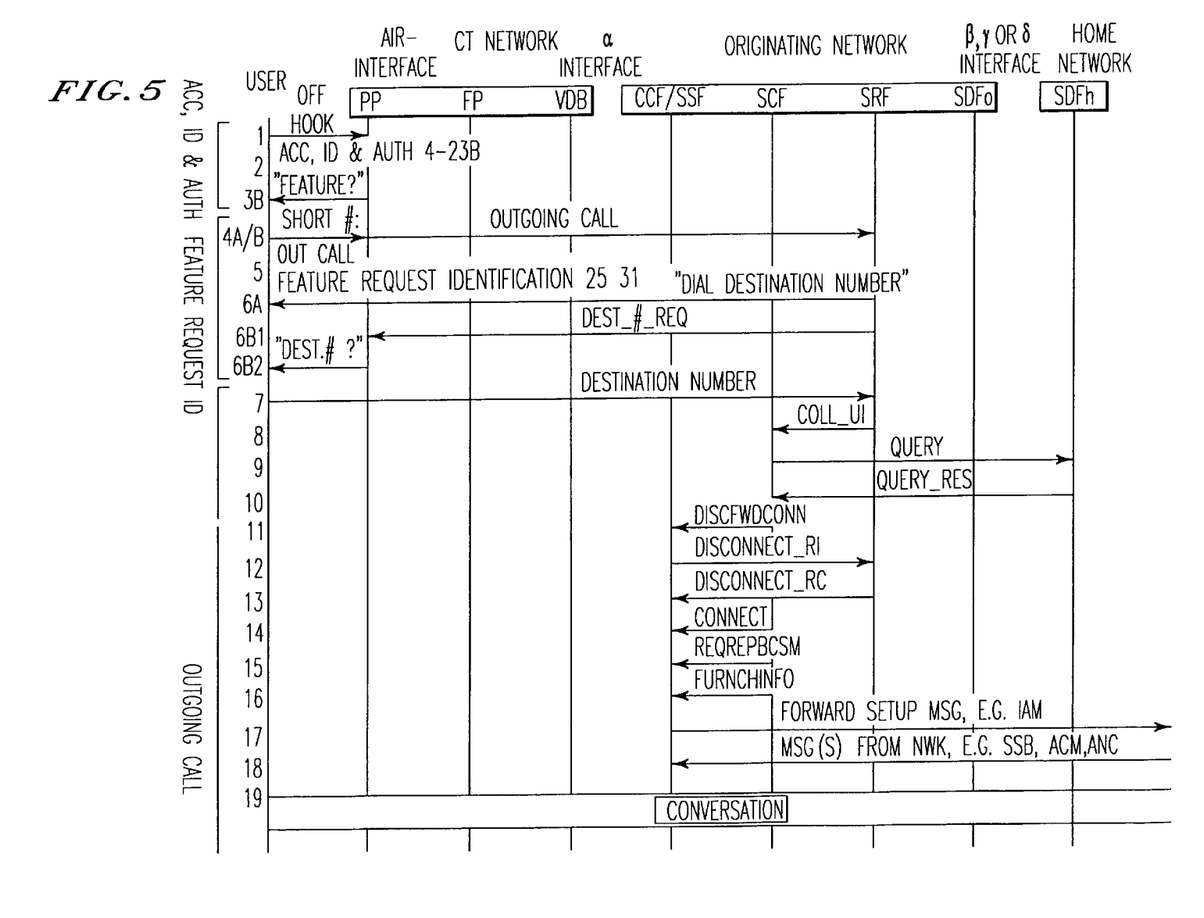
FIGS. 5 and 6 show signal diagrams for outgoing calls.
Figure 6:
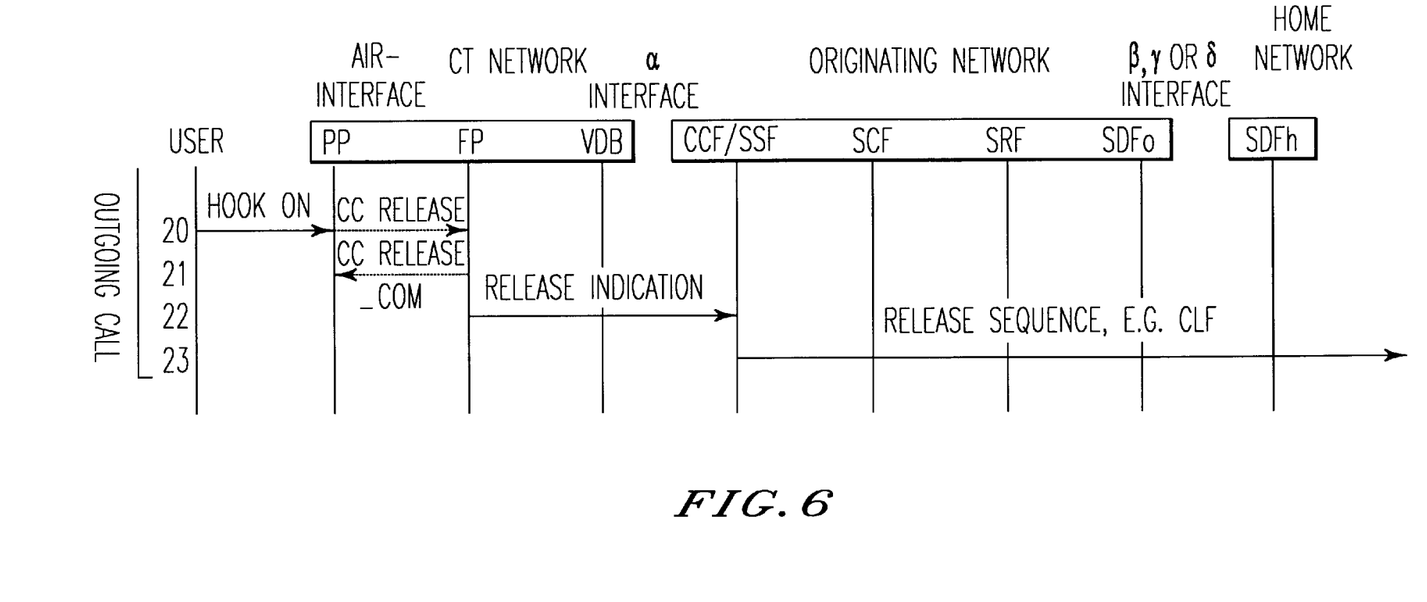

Step 1. If the user wishes to make an outgoing call with his PP via the visiting FP, "he goes off-hook".

Step 2 The PP requests a CC-SETUP message and transfers his IPUI to the FP.

Step 3 The FP asks the VDB about the IPUI.

Step 4 The VDB responds that the IPUI is registered, but orders the FP to transmit an AUTH-REQ message to get the FP to verify the PP to the UPT service.

Step 5 As a consequence of the user having "gone off-hook" (alternative a/b), steps 4 to 25 in the access, identification and verification series are carried out as described in Registration (paragraph 1). As a consequence of the response from the VDB (alternative c), steps 7c to 25c in the same series are carried out.

NOTE: If forcing of speech information is possible, which allows block transmission as described in step 10 in Registration, the user must make a UPT outgoing call inquiry and specify the destination number, after which the PP includes this information in the block transmission. Steps 6b, 7, 9 and 10 will not be needed then.

Step 6 second part On detection of a FEATURE-ID-REQ message from the SRF, the PP asks the user about the function identity, for example in the display.

Step 7 first and second parts If the user gets speech information by the SRF in the normal manner or if he gets an inquiry from the PP via the display, he transmits a UPT OutCall inquiry by using the short-number register in DAM or PP. This inquiry is transmitted to SRF.

Step 7 third part The FP makes an outgoing call inquiry to the SRF. Since the PP made a CC-SETUP inquiry, the FP knows in this alternative c) that it is an outgoing call which the PP wishes to make and that no extra information is needed from the PP.

Step 8 After this function inquiry, steps 27–33 (except the subscriber number inquiry and response in 26a/b2 and 26c/b3) in the function identity inquiry are carried out as described in Registration.

Step 9 second part first section The SRF asks the PP about the destination number.

Step 9 third part, first section The PP asks the user to hit the destination number, for example via the display.

NOTE: Independently of the use of only standard speech information or DTMF-based signalling from the SRF in the preceding steps, the user can be asked directly by the SRF (as in 9a) or by the PP (as in 9b1–9b2).

Step 9 third part, first section The SRF asks the FP about the destination number.

Step 9 third part, second section When the FP receives the inquiry about the destination number from the SRF, he knows that the preceding procedures have been successful and can answer the PP with a CC-CONNECT message. The user gets an answer tone.

Step 23 When the user has finished the conversation, the PP asks for call release through a CC-RELEASE message to the FP.

Step 24 The call release is definite when the FP transmits a CC-RELEASE-COM message.

Step 3 For an Incoming call

Step 20 parts a and b CCF transmits an incoming call inquiry to the FP.

NOTE: The incoming call is connected to the subscriber number of the FP, identified as roaming number of the PP by the home SDF of the PP (step 5). As described in step 26b in Registration (paragraph 1), this roaming number can be either a subscriber number (network address) in a home system or a group number or a connection in a private or public multi-line CT system.

If the network can transfer the A-number identity and the FP is a single-line home system, the incoming call inquiry will also contain the PUI of the PP. If the FP can receive and analyse this information, it will alert the current PP among all registered possible PPs. If this is not the case, the FP must alert all PPs (as in a line seizing system) and the first PP which accepts gets the call.

If the network can handle A-number information and the FP is a multi-line group, the same procedure will be applied. But if the network cannot transfer the identity of the A-number, the FP must allocate a connection number to the PP for registering as roaming number, and have DDI functionality (as described in step 26b in Registration). An incoming call request to the PP is directed to the subscriber number of the PP and the PP is thereby uniquely identified in the FP.

Step 21 When FP receives the incoming call inquiry from CCF, the FP asks about the related IPUI.

NOTE: This connection of network addresses with a CT-specific identity, that is to say IPUI, is always carried out both in single systems and multi-line groups in all digital CT systems today (that is to say CT2, DCT900 and so forth). This is normally an internal inquiry to a single register.

Step 22 The VDB responds with the IPUI of the PP.

Steps 23–28 Normal procedures for incoming calls are carried out by FP and PP (not obligatory for mini-PAP).

Step 35 After release of the calling party and normal releasing procedures in the network, FP requests that PP should release the call.

Step 36 The call release is concluded when the PP transmits a CC-RELEASE-COM message.

The invention is not limited to the embodiment described above but can be subjected to modifications within the context of the subsequent patent claims and concept of the invention.

I claim:

1. A communication system for mobile communication, comprising:

first and second independent cordless base station systems, each designed to operate as a private communication system and comprising a cordless base station having a low power system, wherein the first and second independent cordless base station systems are connected via a telephone network using a personal telephony service;

a cordless mobile unit including a radio transceiver for communicating via the first and second independent cordless base station systems;

means for registering the cordless mobile unit with the first independent cordless base station system when the cordless mobile unit is in range of the first independent cordless base station system and for registering the mobile cordless unit with the second independent cordless base station system when the cordless mobile unit is in range of the second independent cordless base station system so that calls to a phone number of the personal telephony service are assigned to whichever one of the first and second independent cordless base station systems the cordless mobile unit is registered;

means for performing initiating a call from the cordless mobile unit through either one of the first and second independent cordless base station systems and receiving a call for the cordless mobile unit through either one of the first and second independent cordless base station systems; and means for debiting an account corresponding to the personal telephony service based on the call initiated by the cordless mobile unit via the second independent cordless base station system.

2. A system as claimed in claim 1, wherein the first cordless base station system comprises a Digital Electronic Communication Terminal (DECT).

3. A system as claimed in claim 1, wherein the telephone network comprises at least one of a GSM system, an NMT system and a conventional U.S. analog cellular system.

4. The system as claimed in claim 1, wherein the telephone network using the personal telephony service comprises a telephone network using Universal Personal Telecommunications.

5. The system as claimed in claim 1, wherein
the first and second cordless base stations comprise Digital Electronic Communication base stations, and
the telephone network uses Universal Personal Telecommunications and comprises one of a Global System for Mobile communications (GSM) and a Nordic Mobile Telephone (NMT) system.

6. The system as claimed in claim 1, wherein the telephone network comprises a broadband integrated services digital network.

7. The system as claimed in claim 1, wherein the means for registering the cordless mobile unit with the first independent cordless base station comprises:

means for sending a Personal User Identity code from the cordless mobile unit to the first independent cordless base station system.

8. The system as claimed in claim 1, wherein the means for registering the cordless mobile unit with the second independent cordless base station comprises:
 a visitor database connected to the second independent cordless base station system;
 means for sending a Personal User Identity code from the cordless mobile unit to the second independent cordless base station system; and
 means for storing the Personal User Identify code in the visitor database.

9. The system as claimed in claim 1, wherein the cordless mobile unit comprises:
 a cordless mobile unit designating the first independent cordless base station system as a home system.

10. The system as claimed in claim 1, wherein the means for registering the cordless mobile unit comprises:
 means for authenticating the cordless mobile unit to the first and second independent cordless base station systems.

11. The system as claimed in claim 1, wherein:
 the first and second independent cordless base station systems each comprise a list of Access right identities which define a type of cordless mobile unit which is authorized to access a respective independent cordless base station system;
 the cordless mobile unit comprises a portable access rights key (PARK) and means for transmitting the PARK to the first and second independent cordless base station systems; and
 the means for authenticating the cordless mobile unit at the first and second independent cordless base station systems comprises means for authenticating based on the PARK transmitted from the cordless mobile unit.

12. A method of communicating between a cordless mobile unit and plural independent cordless base stations, the method comprising the steps of:
 connecting first and second independent cordless base station systems via a telephone network using a personal telephony service, wherein each of the first and second independent cordless base station systems is designed to operate as a private communication system and comprises a cordless base station having a low power system;
 registering the cordless mobile unit with the first independent cordless base station system when the cordless mobile unit is in range of the first independent cordless base station system and registering the mobile cordless unit with the second independent cordless base station system when the cordless mobile unit is in range of the second independent cordless base station system;
 assigning calls to a phone number of the personal telephony service to whichever one of the first and second independent cordless base station systems the cordless mobile unit is registered;
 performing at least one of (1) initiating a call from the cordless mobile unit through either one of the first and second independent cordless base station systems and (2) receiving a call for the cordless mobile unit through either one of the first and second independent cordless base station systems; and
 debiting an account corresponding to the personal telephony service based on the call initiated by the cordless mobile unit via the second independent cordless based station.

13. The method as claimed in claim 12, wherein the step of connecting comprises connecting the first and second independent cordless base station systems using Universal Personal Telecommunications.

14. The method as claimed in claim 12, wherein the first and second cordless base stations comprise Digital Electronic Communication base stations and the step of connecting comprises:
 connecting the first and second independent cordless base station systems using Universal Personal Telecommunications; and
 using one of a Global System for Mobile communications (GSM) and a Nordic Mobile Telephone (NMT) system as the telephone network.

15. The system as claimed in claim 12, wherein the step of connecting comprises connecting the first and second independent cordless base station systems using a broadband integrated services digital network.

* * * * *